(12) United States Patent
Nassar et al.

(10) Patent No.: US 7,273,631 B2
(45) Date of Patent: Sep. 25, 2007

(54) METHOD OF MAKING FRENCH FRY-STYLE POTATO PRODUCTS

(76) Inventors: Abdalla Nassar, 19029 Ibex Ave., Artesia, CA (US) 90701; Wesam Nassar, 19029 Ibex Ave., Artesia, CA (US) 90701; M. Hatem Nassar, 19029 Ibex Ave., Artesia, CA (US) 90701

( * ) Notice: Subject to any disclaimer, the term of this patent is extended or adjusted under 35 U.S.C. 154(b) by 0 days.

(21) Appl. No.: 11/308,897

(22) Filed: May 23, 2006

(65) Prior Publication Data

US 2006/0233937 A1    Oct. 19, 2006

Related U.S. Application Data

(63) Continuation-in-part of application No. 10/844,120, filed on Jan. 18, 2005, now Pat. No. 7,090,884.

(51) Int. Cl.
*A23L 1/216* (2006.01)
(52) U.S. Cl. ....................... 426/550; 426/637
(58) Field of Classification Search ................ 426/550, 426/637
See application file for complete search history.

(56) References Cited

U.S. PATENT DOCUMENTS

| 4,834,996 A | 5/1989 | Fazzolare et al. ........... 426/302 |
| 4,876,102 A | 10/1989 | Feeney et al. .............. 426/550 |

*Primary Examiner*—Arthur L. Corbin
(74) *Attorney, Agent, or Firm*—Roberto J. Rios; Hoglund & Pamias, PSC

(57) ABSTRACT

A method is described for making a frozen French fry-style food product, having from about 50.0% to about 70.0% moisture, from about 4.0% to about 8.0% protein, from about 2.5% to about 5.0% fat, and from about 0.25% to about 0.50% fibers, in addition to calcium and phosphorous sources. This frozen potato-based product is made from a composition comprising steam peeled and cooked whole raw potatoes, soaked or cooked whole beans processed and mixed with the peeled cooked potatoes to create a dough-like consistency to which proteinaceous flours, starchy flours, vegetable oil, and other additives are added and blended into a homogeneous potato-based dough. The homogeneous potato-based dough is extruded into a rope-like extrudate, which is partially steam-cooked and then immediately cooled. The cold rope-like extrudate is cut into uniform small rods, 2.5 inches long, which are packaged and stored under blast freezing conditions.

22 Claims, 1 Drawing Sheet

… … …

METHOD OF MAKING FRENCH FRY-STYLE POTATO PRODUCTS

CROSS REFERENCE TO RELATED APPLICATIONS

This application is a continuation-in-part of application Ser. No. 10/844,120 filed on Jan. 18, 2005, now U.S. Pat. No. 7,090,884.

FIELD OF INVENTION

This invention relates to a frozen French fry-style food product, and to a method of making said frozen product from a composition comprising of whole raw potatoes, whole beans, proteinacious flour, starch-containing flour, vegetable oil, plus other micro-ingredients including (salt, food grade color, spices, flavoring agents, calcium phosphate, dibasic, and anti-oxidant agent).

BACKGROUND OF INVENTION

French fried potatoes have long been popular as a convenience food, particularly potatoes that have been frozen, and may be easily reheated. Oil has traditionally been the secret behind making a fantastic fry because it tastes good, and creates a pleasing texture and mouth feel. However from a health standpoint, fried foods, including French fries has a terrible reputation among nutritionists since as much as 20% of French fry calories come from oil.

Conventional French fries product is made from specific types of whole raw potatoes such as russet potatoes, processed in several steps starting with steam-peeling and blanching at 160-180° F. for about 15-40 minutes in order to remove natural sugars, to stabilize enzymes and to create a good texture. Blanched, steam-peeled whole potatoes are cut into typical French fries strips, which are inspected electronically for defects. The inspected strips are placed onto shakers in order to remove those pieces, which are too small or misshapen from the main processing line. Blanched strips are coated with a sugar solution for flavor and to give a golden coloring. The sugar coated strips are removed from the sugar solution, drained and placed inside a gas-powered dryer to remove moisture, then coated with a thin batter. The battered French fries strips are put in a fryer for 45-120 seconds at 350-270° F. The fried French fries strips are pre-cooled by placing them inside a freezing-tunnel for 15 minutes to lower the temperature to 0° F., and then placed inside a freezer at −40° F. for 30 minutes, prior to packaging them into bags which are stored into a cold storage.

French fries are conventionally prepared by deep frying the frozen product in oil. Therefore, the conventional French fries at the point of consumption by individual consumers have been fried in oil at rather high temperatures two times, which means that its fat content is between 15% to 20%. It is well known that French fries may contain a large amount of fat (usually saturated) from frying and from some condiments or topping and may be bad for the health of those who consume them regularly. Some researchers have also suggested that the high temperatures used for frying such dishes may have results harmful to health (i.e., acrylamides). In the United States about ¼ of vegetables consumed are prepared as French fries and are believed to contribute to widespread obesity. For example, frying French fries in beef tallow adds saturated fat to the diet. Replacing tallow with tropical oils simply substitutes one saturated fat for another. Moreover, replacing tallow with partially hydrogenated oil reduces cholesterol but adds trans fat. Therefore, there is a need of a method for preparing healthier frozen French fry-style food products.

SUMMARY OF THE INVENTION

The present invention reduces the health harms traditionally associated with frozen French fry-style food products by eliminating at least one step of oil frying, replacing that step by steam-cooking an extrudate, and thus, reducing the fat content in the finished French fry-style food product by about 50%.

To achieve the foregoing and other advantages, the present invention, briefly described, provides a method for making a frozen French fry-style food product, (healthier than the conventional French-fries product) containing from about 2.5% to about 5.0% fat, from about 4.0% to 8.0% protein, from about 55.0% to about 70.0% moisture, and from about 0.25% to about 0.50% fibers.

Advantageously, in accordance with the present invention, the composition from which said healthier, frozen French-fry style food product is made consists of whole raw potatoes selectively cooked either in steam or hot boiling water, and mashed into a dough-like consistency, whole beans (selected from the group comprising of great northern beans, pink beans, pinto beans) which are selectively either soaked at least overnight in water or cooked in boiling water then ground into a dough-like consistency. Additionally, proteinacious flour (such as wheat gluten, calcium casienates, soy protein concentrate, soy protein isolate, albumen, and mixtures thereof), starchy flour (such as rice flour, modified food starch, dehydrated potato flakes, dehydrated potato granules, and mixtures thereof), vegetable oil, salt, spices, food grade color, flavoring agents, calcium phosphate, dibasic, and sodium sulfite are added. The components of said composition undergo certain steps of the process before they are all blended together into a homogeneous potato-based dough. Next, the homogeneous potato-based dough is pumped into forming heads containing ⅝×⅝ inch square openings out of which exits rope-like extrudate falling over the hot surface of a belt conveyor traveling inside an open-end steam path thus exposing said rope-like extrudate to live steam, partially cooking the extrudate. The partially-cooked extrudate exits the steam path, falling over a chain conveyor traveling inside an open-end freezing-tunnel, where it is cooled down. The cold extrudate exits the freezing-tunnel to fall over another chain conveyor, at which end a set of rolling knives is placed to cut the partially cooked, cold extrudate into small rods of 2½" in length. These rods are further cooled down to about 35° F., packaged and then stored under blast freezing conditions.

BRIEF DESCRIPTION OF THE DRAWINGS

The preferred embodiments of the invention will herein after be described in conjunction with the included drawings provided to illustrate and not to limit the invention, wherein like designations denote like elements, and in which.

DETAILED DESCRIPTION OF THE INVENTION

Figure 1A:
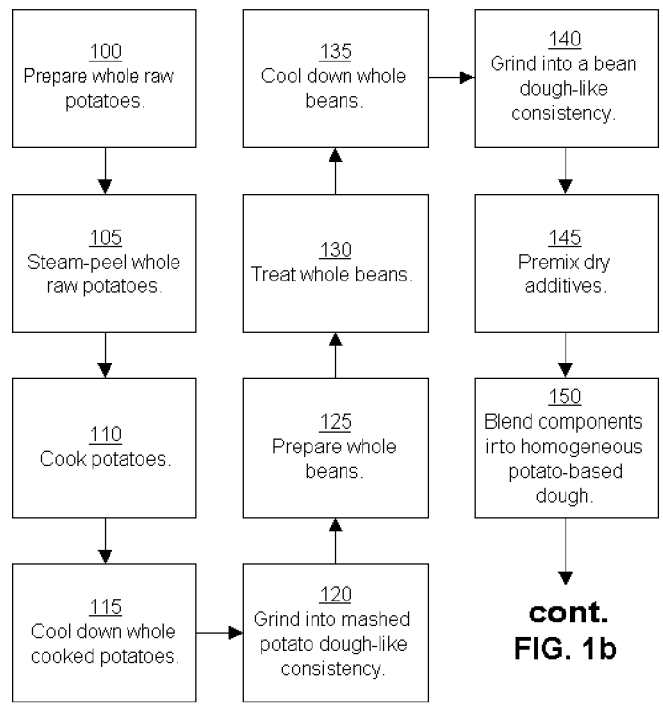
FIG. 1a shows a flowchart of the preferred embodiment explaining the general steps of the method by which the homogeneous potato-based dough, from which the frozen French fries-style food product is made, is prepared.

This invention relates to a frozen French fry-style food product made from a composition based on whole raw potatoes, as its major component. Said whole raw potatoes, before being processed, are steam-peeled by any well known conventional means and then selectively cooked either in steam or hot water at a temperature ranging from about 180° F. to about 200° F., for about 20 to 40 minutes. Said whole cooked steam-peeled potatoes represent from about 60.0% to about 80.0% of said composition. The remaining balance of the composition comes from other food components due to their specific characteristic functions. Other composition component comprises whole beans selected from the group comprising at least one of: great northern beans, pink beans, pinto beans, or a combination thereof. The whole beans are selectively either soaked at least overnight in water or cooked in boiling water, and represent from about 10.0% to about 30.0% of said composition. Another composition component comprises proteinacious flours such as but not limited to wheat gluten, calcium casienates, soy protein concentrate, soy protein isolate, albumen, and combinations thereof. The proteinacious flours represent from about 2.50% to about 5.0% of said composition. Still another component comprises oil selected from the group comprising at least one of: vegetable oil, canola oil, coconut oil, corn oil, flaxseed oil, grapeseed oil, olive oil, palm oil, palm kernel oil, peanut oil, safflower oil, sesame oil, soybean oil or a combination thereof. The oil component represents from about 2.5% to about 5.0% of said composition. Another component comprises starch-containing materials such as but not limited to: rice flour, food starch, dehydrated potato flakes, dehydrated potato granules, or a combination thereof. The starch-containing materials represent from about 2.50% to about 5.0% of said composition. Additionally, sodium chloride represents from about 1.20% to about 2.50% of said composition and glycerides represent from about 0.25% to about 0.50% of said composition. Another component comprises food grade colors selected from but not limited to the group comprising at least one of: yellow 5, turmeric, annatto or a combination thereof. The food grade colors represent from about 0.01% to about 0.03% of said composition. Another component comprises onion selected from the group comprising at least one of: onion powder, raw onion, dried onion, processed onion or a combination thereof. The onion component represents from about 0.15% to about 0.25% of said composition. Still another component comprises garlic selected from the group comprising at least one of: garlic powder, raw garlic, dried garlic, processed garlic or a combination thereof. The garlic component represents from about 0.15% to about 0.25% of said composition. In addition, calcium phosphate-dibasic represent from about 0.05% to about 0.10% of said composition. Furthermore, at least one anti-discoloration agent is added comprising at least one of: sodium bi-sulfite representing from about 0.002% to about 0.004% of said composition, pyrophosphoric acid representing from about 0.004% to about 0.008% of said composition, or a combination thereof. In the preferred embodiment the discoloration agent comprises pyrophosphoric acid and sodium bi-sulfite. However, other discoloration agents could be alternatively used. All above percentages are by weight of the composition of the finished frozen product.

Figure 1B:
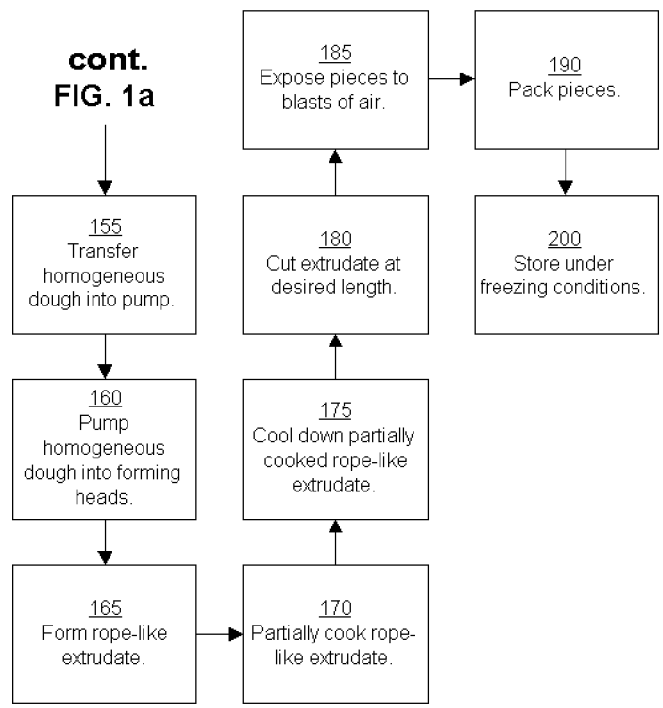
FIG. 1b shows a continuing flowchart of the preferred embodiment explaining the remaining steps of the method.

The method by which the composition is processed to make said frozen French fry-style food product will be explained now in view of FIG. 1a and FIG. 1b.

In the preferred embodiment of the invention, at step 100 the whole raw potatoes are pre-selected by ensuring they are free from physiological disorder such as growth cracks, hollow heart, or any other shape of growth disorder. Afterwards, the pre-selected potatoes are thoroughly washed and cleaned. At step 105, the potatoes are then placed in steam-peelers to remove skins and mechanically scrubbed to remove any remaining peel. The steam-peeled whole potatoes are cooked at step 110 from about 180° F. to about 200° F. in clean hot water. In the preferred embodiment, the hot water is mixed with vinegar, citrus acids, sodium chloride, sodium bisulfite, and pyrophosphoric acid as an anti-discoloration agent. The steam-peeled whole potatoes are cooked for a period of about 20 minutes to about 40 minutes to inactivate and stabilize all enzymes. Alternatively, said steam pealed whole potatoes could be cooked in steam. At step 115, said whole cooked potatoes are cooled down to about 55° F. by any conventional cooling means. At step 120, the cooled potatoes are placed in a food grinder to be mashed into a dough-like consistency. In the preferred embodiment a food grinder is used. However, any other equivalent food processing means could be alternatively used. Next, at step 125, whole beans are prepared by thoroughly washing them. At step 130, the washed beans are selectively either soaked in water for at least 24 hours or cooked in clean boiling water for about 90-120 minutes, drained and washed. At step 135, the beans are then chilled at about 55-45° F. In the preferred embodiment, said beans are chilled in cold water. However, it should be understood that any other conventional chilling means could be alternatively used. The above mentioned chilled soaked or cooked beans are ground into a dough-like consistency at step 140. Next, at step 145, all the dry additive components (protenacious flours, starchy flours, sodium chloride, calcium phosphate-dibasic, onion powder, garlic powder, flavoring agents, food grade colors, and sodium sulfite) are pre-mixed into a uniform dry blend. The flavoring agents are selected from a group comprising at least one of: hickory smoke, paprika, basil, cumen, curry, bacon, cheddar cheese or a combination thereof. Then, at step 150, the resulting mashed potato dough-like mix of step 120, the resulting bean dough-like mix of step 140, the pre-mixed dry blend of step 145, and vegetable oil are all added inside a blending apparatus and are blended into a homogeneous potato-based dough. In the preferred embodiment, a twin-blade blender is used. However, it is also possible to alternatively use any other conventional blending means well known in the art. The entire content of said twin-blade blender represents the complete composition from which the frozen French fry product is made.

The potato-based dough is transferred to a pumping equipment at step 155. Afterwards, at step 160, the potato-based dough is selectively pumped to a specific forming head containing ⅝×⅝ inch square openings. It is also envisioned to use forming heads comprising openings having different sizes and/or shapes without departing from the spirit of the invention. At step 165, the potato-based dough exits said forming heads in a rope-like shape extrudate, continuously falling over the hot surface of a belt conveyor, wherein said hot surface has been pre-treated with a stick-preventing means to prevent any possible sticking of the rope-like extrudate. In the preferred embodiment the stick-preventing means comprises at least one of: vegetable oil, a silicon-based spray or a combination thereof. However, any other equivalent stick-preventing means could be alternatively used without departing from the spirit of the invention. At step 170, the hot belt conveyor travels inside an open-end steam apparatus comprising a steam path to expose the rope-like extrudate to live steam for a dwell time from about 4 minutes to about 8 minutes. During that time the inner temperature of the rope-like extrudate rises up to about 140° F. to about 190° F., partially cooking the rope-like extrudate and consequently firming up its structure. Alternatively, the rope-like extrudate could be subjected to different combinations of time and temperature without departing from the spirit of the invention. At step 175, the partially cooked rope-like extrudate exits the steam path to fall over the surface of another chain conveyor traveling inside an open-end freezing tunnel, exposing the partially cooked rope-like extrudate to blasts of cold air from about 4 minutes to about 8 minutes. During that time the inner temperature of the rope-like extrudate falls down to about 55° F. to about 45° F. Alternatively, the rope-like extrudate could be subjected to different combinations of time and temperature without departing from the spirit of the invention. Afterwards, at step 180, the cold rope-like extrudate exits the freezing tunnel to fall over the surface of another chain conveyor moving toward a cutting apparatus located at its end. In the preferred embodiment, the cutting apparatus comprises a set of rolling knives arbitrarily positioned at an end of the conveyor belt. However, any other equivalent cutting means could be alternatively used and selectively located with respect to said chain conveyor without departing from the spirit of the invention. These rolling knives are selectively adapted to cut the rope-like extrudate into small rods of 2½ inches long. Alternatively, the small rods could be cut into pieces of different sizes without departing from the spirit of the invention. At step 185, the rods are further cooled; packaged at step 190; and finally stored under blast freezing conditions at step 200. Once the product is delivered to a consumer through conventional distribution means, the consumer cooks the product using any well known conventional cooking means.

This specification and the accompanying figures disclose the preferred embodiment as example of the invention. The invention is not intended to be limited to the embodiment illustrated. Numerous modifications, changes, variations, substitutions and equivalents will be apparent to those skilled in the art without departing from the spirit and scope of the present invention as described in accompanying the claims.

What is claimed is:

1. A method of making a frozen French fry-style food product containing from about 4.0% to about 8.0% protein, from about 55.0% to about 70.0% moisture from about 2.5% to about 5.0% fat, and from about 0.25% to about 0.50% fibers, the method comprising the steps of:

steam-peeling whole raw potatoes comprising 60.0% to 80.0% by weight of said food product and then selectively cooking said whole raw potatoes in: steam, hot water, or a combination thereof, cooling the cooked potatoes and mashing the cooled potatoes to form a potato dough, and transferring said dough inside a blending device;

selectively treating whole beans comprising from about 10% to about 30% by weight of said food product by: soaking said beans in water, cooking said beans in boiling water, or a combination thereof, and draining said beans, wherein said beans are transferred to a mixing apparatus to form a bean dough; and forming a homogeneous dry pre-mix by mixing together: proteinacious flour in an amount of about 2.5% to 5.0% by weight of said food product, starch containing material in an amount of about 1.5% to 5.0% by weight of said food product, and at least one micro-ingredient selected from the group consisting of: salt, glycerides, spices, flavoring agents, food grade color, calcium phosphate-dibasic, and antioxidant agents, wherein said at least one micro-ingredient in present in an amount of about 1.5% to 4.0% by weight of said food product and; wherein said bean dough and said homogeneous dry pre-mix are further combined substantially simultaneously with said potato dough inside said blending device.

2. The method of claim 1, wherein said whole, steam-peeled potatoes are cooked in water at a temperature from about 180 Fahrenheit degrees to about 200 Fahrenheit degrees.

3. The method of claim 2, wherein said whole, steam-peeled potatoes are cooked from about 20 minutes to about 40 minutes.

4. The method of claim 1, wherein said water for cooking said whole, steam-peeled potatoes comprises at least one of: vinegar, citrus acid, sodium bisulfate, and pyrophosphoric acid.

5. The method of claim 1, wherein said steam-peeled cooled potatoes are cooled down to about 55.0 Fahrenheit degrees to about 45.0 Fahrenheit degrees.

6. The method of claim 1, wherein said whole beans comprise at least one of: pinto beans, pink beans, and great northern beans.

7. The method of claim 1, wherein said whole beans are soaked in water for about 24 hours to 36 hours.

8. The method of claim 1, wherein said water for soaking said whole beans comprises: about 0.50% to about 1.0% sodium chloride; and about 0.10% to about 0.20% potassium sorbate for mold inhibition.

9. The method of claim 1, wherein said soaked whole beans are chilled at a temperature of about 55.0 Fahrenheit degrees to about 45.0 Fahrenheit degrees after draining said beans.

10. The method of claim 1, wherein said whole beans are cooled in water for about 8 hours to 12 hours after being soaked and drained.

11. The method of claim 1, wherein said proteinacious flour comprises at least one of: calcium caseinate, wheat gluten, soy protein concentrate, soy protein isolate, and albume.

12. The method of claim 1, wherein said starch containing material comprises at least one of: rice flour, food starch, dehydrated potato flakes, and dehydrated potato granules.

13. The method of claim 1, wherein said food grade color comprises at least one of: yellow 5, turmeric, and annatto.

14. The method of claim 1, wherein said proteinacious flour, starch containing material, and said micro-ingredient are mixed together to form a uniform premix.

15. The method of claim 1, wherein said whole beans are cooked in boiling water for about 90 to about 120 minutes.

16. The method of claim 1, wherein said potato dough comprises from about 55.0% to about 70.0% moisture.

17. The method of claim 1, further comprising the steps of:

transferring said potato dough to a pumping apparatus and pumping said potato dough to a forming head containing ⅝"×⅝" openings, out of which exits a rope-like extrudate, wherein said rope-like extrudate is continuously received over the surface of a steam-heated conveyor belt, wherein a silicon based spray, vegetable oil or a combination thereof is applied to said surface of said steam-heated conveyor belt;

partially cooking said rope-like extrudate by directing said conveyor belt inside an open-end steam path apparatus and exposing to live steam said rope-like extrudate received over the surface of said conveyor belt;

lowering the partially cooked rope-like extrudate temperature by receiving, on a chain conveyor traveling inside an open-end freezing tunnel, said partially cooked rope-like extrudate that exits said open-end steam path apparatus, wherein said partially cooked rope-like extrudate is exposed to blasts of air;

cutting said rope-like extrudate into 2½" rods by receiving said rope-like extrudate exiting the freezing tunnel on a second chain conveyor, wherein a set of rolling knives is positioned at one end of said second chain conveyor; and packaging and storing said rods under freezing conditions.

18. The method of claim 17, wherein the inner temperature of said partially cooked rope-like extrudate is from about 140.0 Fahrenheit degrees to about 190.0 Fahrenheit degrees.

19. The method of claim 17, wherein said rope-like extrudate is partially cooked inside said steam path from about 4 minutes to about 8 minutes.

20. The method of claim 17, wherein said rope-like extrudate inside said freezing tunnel is cooled from about 4 minutes to about 8 minutes.

21. The method of claim 17, wherein the inner temperature of said rope-like extrudate is from about 55.0 Fahrenheit degrees to about 45.0 Fahrenheit degrees.

22. The method of claim 1, wherein oil is added to the combination of said bean dough, said potato dough, and said homogeneous dry premix to form a homogeneous potato-based dough.

* * * * *